United States Patent
Ansley et al.

(10) Patent No.: US 12,068,801 B2
(45) Date of Patent: Aug. 20, 2024

(54) CONFIGURING DEDICATED SERVICE FLOWS FOR HOME NETWORKS

(71) Applicant: ARRIS Enterprises LLC, Suwanee, GA (US)

(72) Inventors: Carol J. Ansley, Johns Creek, GA (US); Charles Peter Cheevers, Alpharetta, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 268 days.

(21) Appl. No.: 17/463,828

(22) Filed: Sep. 1, 2021

(65) Prior Publication Data

US 2022/0140862 A1    May 5, 2022

Related U.S. Application Data

(60) Provisional application No. 63/107,084, filed on Oct. 29, 2020.

(51) Int. Cl.
*H04L 12/46* (2006.01)
*H04B 3/02* (2006.01)
*H04W 28/02* (2009.01)

(52) U.S. Cl.
CPC .......... *H04B 3/02* (2013.01); *H04L 12/4633* (2013.01); *H04L 12/4641* (2013.01); *H04W 28/0268* (2013.01)

(58) Field of Classification Search
CPC ... H04B 3/02; H04L 12/4633; H04L 12/4641; H04L 47/825; H04L 47/805; H04W 28/0268; H04W 8/04
See application file for complete search history.

(56) References Cited

U.S. PATENT DOCUMENTS

| | | | |
|---|---|---|---|
| 7,835,275 B1* | 11/2010 | Swan | H04L 47/70 370/230.1 |
| 2008/0192692 A1* | 8/2008 | Chari | H04L 47/50 370/331 |

(Continued)

OTHER PUBLICATIONS

International Search Report and Written Opinion of the International Searching Authority issued Dec. 22, 2021 in International (PCT) Application No. PCT/US2021/048631.

(Continued)

*Primary Examiner* — Kenneth T Lam
(74) *Attorney, Agent, or Firm* — Wenderoth, Lind & Ponack, L.L.P.

(57) ABSTRACT

A service provider server is provided for use with a network node, and a cable modem. The service provider server includes a memory and a processor configured to execute instructions stored on the memory to cause the service provider server to provide a first downstream service flow to the cable modem by way of the network node, the first downstream service flow having a first set of privileges, receive a first upstream service flow from the cable modem by way of the network node, provide a second downstream service flow to the cable modem by way of the network node, the second downstream service flow having a second set of privileges that are different from the first set of privileges, and receive a second upstream service flow from the cable modem by way of the network node.

12 Claims, 12 Drawing Sheets

(56) References Cited

U.S. PATENT DOCUMENTS

2014/0003336 A1\* 1/2014 Padden .................. H04L 67/61
370/328
2015/0223114 A1\* 8/2015 Tian .................. H04W 28/0268
370/235
2018/0359764 A1\* 12/2018 Ong .................... H04L 12/4641

OTHER PUBLICATIONS

International Preliminary Report on Patentability and Written Opinion issued May 11, 2023 in International Application No. PCT/US2021/048631.

\* cited by examiner

CONFIGURING DEDICATED SERVICE FLOWS FOR HOME NETWORKS

BACKGROUND

Embodiments of present disclosure relate to systems and methods of managing service flows for home networks.

SUMMARY

Aspects of the present disclosure are drawn to a service provider server for use with a network node, and a cable modem. The service provider server includes a memory and a processor configured to execute instructions stored on the memory to cause the service provider server to provide a first downstream service flow to the cable modem by way of the network node, the first downstream service flow having a first set of privileges, receive a first upstream service flow from the cable modem by way of the network node, provide a second downstream service flow to the cable modem by way of the network node, the second downstream service flow having a second set of privileges that are different from the first set of privileges, and receive a second upstream service flow from the cable modem by way of the network node.

In some embodiments, the service provider server also works with an employer server and a wide area network (WAN). The employer server being configured to provide an employer network service via the WAN, wherein the processor is configured to execute instructions stored on the memory to cause the service provider server further to provide the second downstream service flow so as to include the employer network service.

In some embodiments, the second downstream service flow provided by the service provider server includes a virtual private network (VPN) tunneled through the WAN from the employer server to the cable modem.

In some embodiments, the first downstream service flow of the service provider server has a first quality of service and a first bandwidth; the second downstream service flow has a second quality of service and a second bandwidth; and the first quality of service is different from the second quality of service as well as the first bandwidth is different from the second bandwidth.

Other aspects of the present disclosure are drawn to a method of using a service provider server with a network node, and a cable modem. The method includes: providing, via a processor configured to execute instructions stored on a memory, a first downstream service flow to the cable modem by way of the network node, the first downstream service flow having a first set of privileges; receiving, via the processor, the first upstream service flow from the cable modem by way of the network node; providing, via the processor, the second downstream service flow to the cable modem by way of the network node, the second downstream service flow having a second set of privileges that are different from the first set of privileges; and receiving, via the processor, a second upstream service flow from the cable modem by way of the network node.

In some embodiments, the method additionally uses with an employer server and a WAN, wherein the employer server being configured to provide an employer network service via the WAN to provide the second downstream service flow so as to include the employer network service.

In some embodiments, the method includes providing the second downstream service flow which includes a VPN tunneled through the WAN from the employer server to the cable modem.

In some embodiments, the method provides the first downstream service flow with a first quality of service and a first bandwidth, and the second downstream service flow with a second quality of service and a second bandwidth, wherein the first quality of service is different than the second quality of service and the first bandwidth is different than the second bandwidth.

Other aspects of the present disclosure are drawn to a non-transitory, computer-readable media having computer-readable instructions stored thereon, the computer-readable instructions being capable of being read by a service provider server with a network node, and a cable modem, wherein the computer-readable instructions are capable of instructing the service provider server to perform the method: providing, via a processor configured to execute instructions stored on a memory, a first downstream service flow to the cable modem by way of the network node, the first downstream service flow having a first set of privileges; receiving, via the processor, a first upstream service flow from the cable modem by way of the network node; providing, via the processor, a second downstream service flow to the cable modem by way of the network node, the second downstream service flow having a second set of privileges that are different from the first set of privileges; and receiving, via the processor, a second upstream service flow from the cable modem by way of the network node.

In some embodiments, the non-transitory, computer-readable media additional uses with an employer server and a wide area network (WAN), the employer server being configured to provide an employer network service via the WAN, wherein the computer-readable instructions are capable of instructing the network node to perform the method wherein the providing the second downstream service flow includes providing the second downstream service flow so as to include the employer network service.

In some embodiments, the non-transitory, computer-readable media includes the computer-readable instructions capable of instructing the network node to perform the method wherein the providing the second downstream service flow includes providing the second downstream service flow which includes a virtual private network tunneled through the WAN from the employer server to the cable modem.

In some embodiments, the non-transitory, computer-readable media includes the computer-readable instructions capable of instructing the network node to perform the method wherein: the first downstream service flow has a first quality of service and a first bandwidth, the second downstream service flow has a second quality of service and a second bandwidth, the first quality of service is different from the second quality of service, and the first bandwidth is different from the second bandwidth.

Other aspects of the present disclosure are drawn to a cable modem for use with a service provider server configured to provide a first downstream service flow having first service flow data, to provide a second downstream service flow having second service flow data, to provide a first upstream service flow, and to provide a second upstream service flow. The cable modem includes a memory and a processor configured to execute instructions stored on the memory to cause the cable modem to: provide a first wireless network having a first SSID; provide a second wireless network having a second SSID; receive the first downstream service flow and provide the first service flow data to the first wireless network; receive the second downstream service flow and provide the second service flow data to the second wireless network; receive first upstream service flow data from the first wireless network and transmit the first upstream service flow data to the service provider server via the first upstream service flow; and receive second upstream service flow data from the second wireless network and transmit the second upstream service flow data to the service provider server via the second upstream service flow.

In some embodiments, the processor is configured to execute instructions stored on the memory to additionally cause the service provider server to: provide the first service flow data only to the first wireless network; provide the second service flow data only to the second wireless network; transmit the first upstream service flow data to the service provider server via only the first upstream service flow; and transmit the second upstream service flow data to the service provider server via only the second upstream service flow.

In some embodiments, the cable modem is for additional use with a first client device associated with the first wireless network, and a second client device associated with the second wireless network. In some of these embodiments, the processor is configured to execute instructions stored on the memory to additionally cause the service provider server to: provide the first service flow data only to the first client device via the first wireless network; and provide the second service flow data only to the second client device via the second wireless network.

In some embodiments, the cable modem is for additional use with a first client device associated with the first wireless network, and a second client device associated with the first wireless network. In some of these embodiments, the processor is configured to execute instructions stored on the memory to additionally cause the service provider server to: provide the first service flow data only to the first client device via the first wireless network; and provide the second service flow data only to the second client device via the first wireless network.

Other aspects of the present disclosure are drawn to a method of using a cable modem with a service provider server configured to provide a first downstream service flow having first service flow data, to provide a second downstream service flow having second service flow data, to provide a first upstream service flow, and to provide a second upstream service flow. The method includes: providing, via a processor configured to execute instructions stored on a memory, a first wireless network having a first SSID; providing, via the processor, a second wireless network having a second SSID; receiving, via the processor, the first downstream service flow and provide the first service flow data to the first wireless network; receiving, via the processor, the second downstream service flow and provide the second service flow data to the second wireless network; receiving, via the processor, first upstream service flow data from the first wireless network and transmit the first upstream service flow data to the service provider server via the first upstream service flow; and receiving, via the processor, second upstream service flow data from the second wireless network and transmit the second upstream service flow data to the service provider server via the second upstream service flow.

In some embodiments, the providing the first service flow data includes providing the first service flow data only to the first wireless network; the providing the second service flow data includes providing the second service flow data only to the second wireless network; the transmitting the first upstream service flow data includes transmitting the first upstream service flow data to the service provider server via only the first upstream service flow; and the transmitting the second upstream service flow data includes transmitting the second upstream service flow data to the service provider server via only the second upstream service flow.

In some embodiments, the method is for additional use with a first client device associated with the first wireless network, and a second client device associated with the second wireless network. In some of these embodiments, the method further includes: providing, via the processor, the first service flow data only to the first client device via the first wireless network; and providing, via the processor, the second service flow data only to the second client device via the second wireless network.

In some embodiments, the method is for additional use with a first client device associated with the first wireless network, and a second client device associated with the first wireless network. In some of these embodiments, the method further includes: providing, via the processor, the first service flow data only to the first client device via the first wireless network; and providing, via the processor, the second service flow data only to the second client device via the first wireless network.

Other aspects of the present disclosure are drawn to a non-transitory, computer-readable media having computer-readable instructions stored thereon, wherein the computer-readable instructions are capable of being read by a cable modem for use with a service provider server configured to provide a first downstream service flow having first service flow data, to provide a second downstream service flow having second service flow data, to provide a first upstream service flow, and to provide a second upstream service flow. The computer-readable instructions are capable of instructing the cable modem to perform the method including: providing, via a processor configured to execute instructions stored on a memory, a first wireless network having a first SSID; providing, via the processor, a second wireless network having a second SSID; receiving, via the processor, the first downstream service flow and provide the first service flow data to the first wireless network; receiving, via the processor, the second downstream service flow and provide the second service flow data to the second wireless network; receiving, via the processor, first upstream service flow data from the first wireless network and transmit the first upstream service flow data to the service provider server via the first upstream service flow; and receiving, via the processor, second upstream service flow data from the second wireless network and transmit the second upstream service flow data to the service provider server via the second upstream service flow.

In some embodiments, the computer-readable instructions are capable of instructing the cable modem to perform the method wherein the providing the first service flow data includes providing the first service flow data only to the first wireless network; wherein the providing the second service flow data includes providing the second service flow data only to the second wireless network; wherein the transmitting the first upstream service flow data includes transmitting the first upstream service flow data to the service provider server via only the first upstream service flow; and wherein the transmitting the second upstream service flow data includes transmitting the second upstream service flow data to the service provider server via only the second upstream service flow.

In some embodiments, the computer-readable instructions are capable of being read by a cable modem for additional use with a first client device associated with the first wireless network, and a second client device associated with the second wireless network. In some of these embodiments, the computer-readable instructions are capable of instructing the cable modem to perform the method further including: providing, via the processor, the first service flow data only to the first client device via the first wireless network; and providing, via the processor, the second service flow data only to the second client device via the second wireless network.

In some embodiments, the computer-readable instructions are capable of being read by a cable modem for additional use with a first client device associated with the first wireless network, and a second client device associated with the first wireless network. In some of these embodiments, the computer-readable instructions are capable of instructing the cable modem to perform the method further including: providing, via the processor, the first service flow data only to the first client device via the first wireless network; and providing, via the processor, the second service flow data only to the second client device via the first wireless network.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
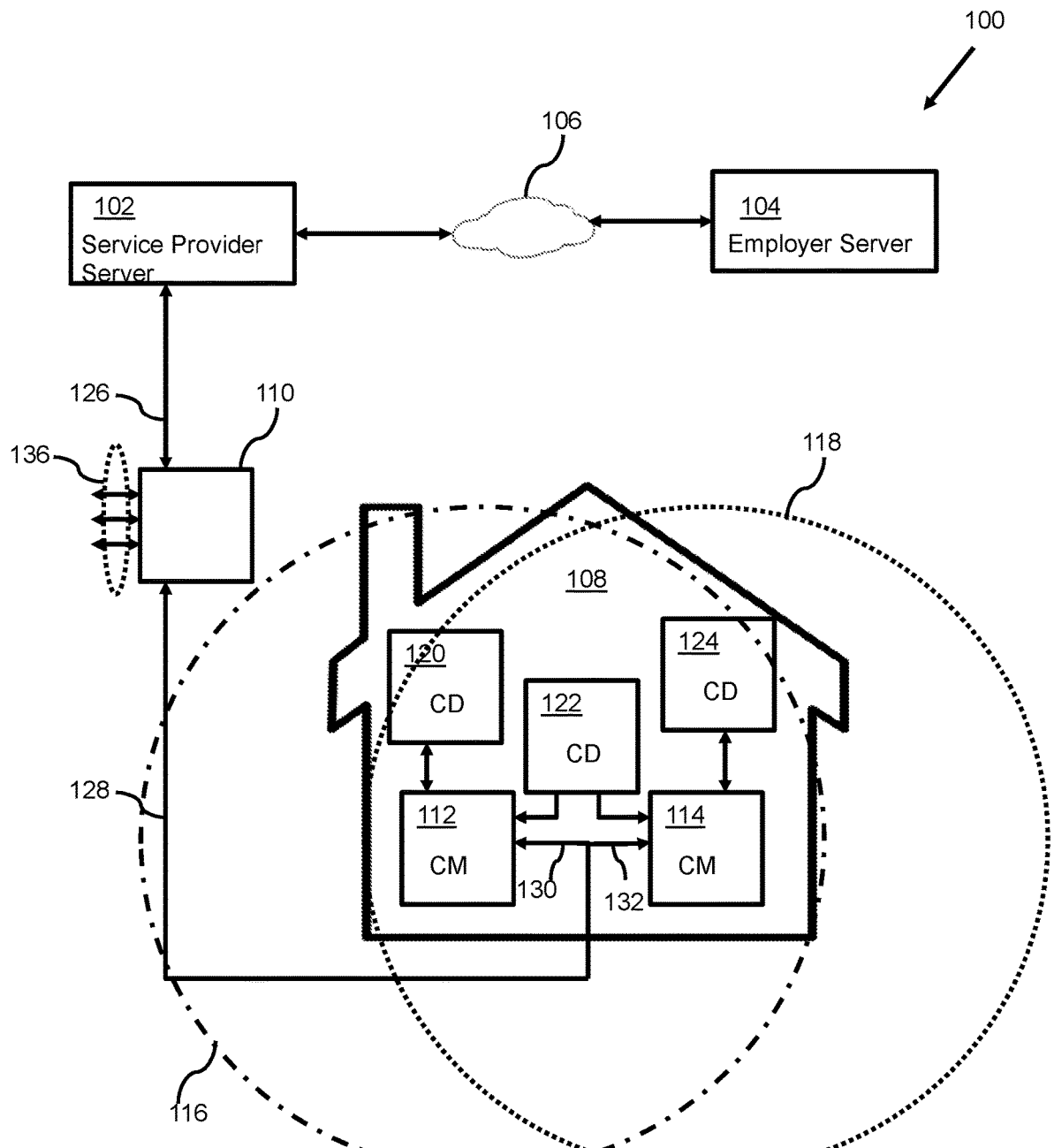
FIG. 1 illustrates structural components implementing a communication infrastructure with two cable modems.

FIG. 1 illustrates structural components implementing a communication infrastructure 100. Communication infrastructure 100 includes: an employer server 104, a WAN 106, a service provider server 102, a network node 110 and a residence 108 which includes one or multiple cable modems, a sample of which are illustrated as cable modem 112 and a cable modem 114, and a plurality of client devices, a sample of which are illustrated as a client device 120, a client device 122, and a client device 124. Residence 108 has two wireless networks, 116 and 118, which are distributed by the two cable modems, 112 and 114, on two separate bands, 4 GHz and 5 GHz. Cable modem 114 can communicate with employer server 104 by way of network node 110, service provider server 102, and WAN 106. Network node 110 provides a plurality of service flows 136 to multiple home networks in addition to one, service flow 512, dedicated for residence 108. At residence 108, communication line 128 splits into two communication lines, 130 and 132, to feed into two cable modems, 112 and 114.

For purposes of discussion, in communication infrastructure 100, presume that cable modem 112 provides wireless network 116 for home use, whereas cable modem 114 provides wireless network 118 for work at home use. In any event, the services provided by service provider 102 are provided on a single service flow through communication line 128, which is shared by cable modem 112 and cable modem 114, via communication lines 130 and 132 respectively.

Figure 2:
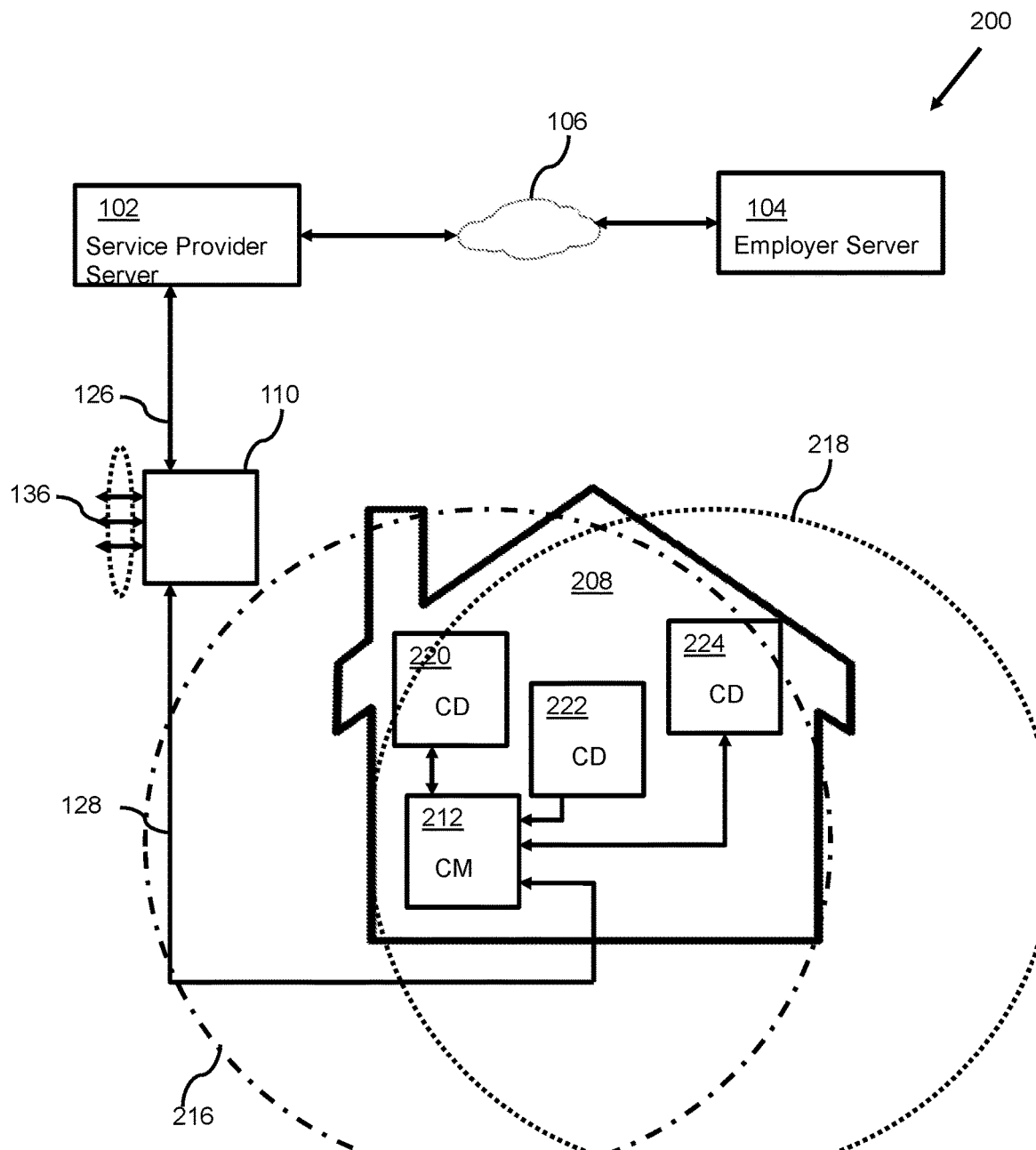
FIG. 2 illustrates structural components implementing a communication infrastructure with one cable modem.

FIG. 2 illustrates structural components implementing a communication infrastructure 200. Communication infrastructure 200 includes: an employer server 104, a WAN 106, a service provider server 102, a network node 110 and a residence 208. Residence 208 is similar to residence 108 in FIG. 1; however, residence 208 has only one cable modem, cable modem 212, with a plurality of client devices, a sample of which are illustrated as a client device 220, a client device 222, and a client device 224. Residence 208 has two wireless networks, 216 and 218, which are distributed by cable modem 212 on two separate bands, non-limiting examples of which include the 2.4 Ghz band and the 5 Ghz band. Cable modem 212 directly communicates with network node 110 through communication line 128. Cable modem 212 can communicate with employer server 104 by way of network node 110 and service provider server 102. Note that, in this scenario, all traffic in residence 208 is combined into one service flow with no differentiation between two wireless networks.

Figure 3A:
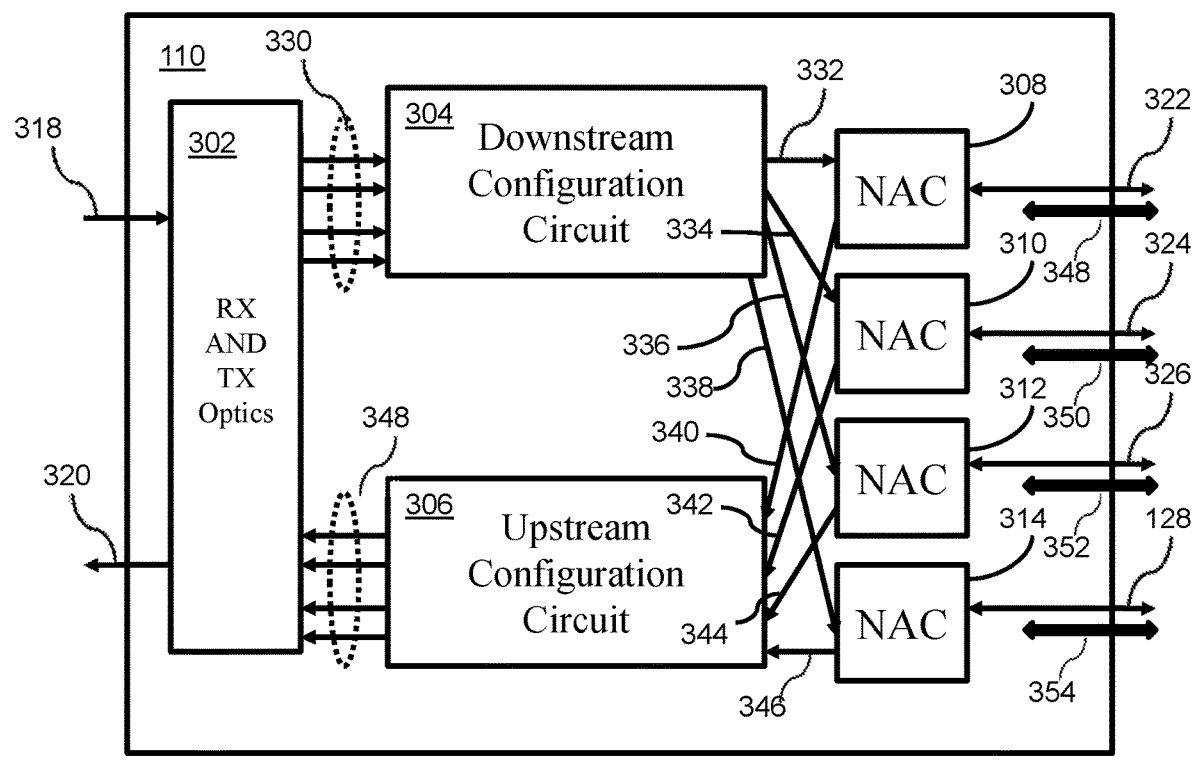
FIG. 3A illustrates an exploded view of the network node with multiple service flows for multiple subscribers (home networks).

FIG. 3A illustrates the exploded view of network node 110 as shown in FIG. 1 and FIG. 2 at time $t_0$.

As shown in FIG. 3A, network node 110 includes an optical communication component 302, a downstream configuration component 304, an upstream configuration component 306, a network access component (NAC) 308, a NAC 310, a NAC 312, and a NAC 314. Network node 110 communicates with service provider server 102 via downstream service flow group 318 and upstream service flow group 320. For simplicity, downstream service flow 318 and upstream service flow 320 are shown as a communication line 126 in FIG. 2.

In operation, optical communication component 302 will receive the optical service group provider downstream data signals transmitted by service provider server 102 via service provider downstream line 318. Once received, optical communication component 302 will de-multiplex the wavelengths from the single optical line into separate optical signals that are then converted into RF signals. In this example embodiment, the optical signal received contains a wavelength. At this time, optical communication component 302 will transmit the wavelength as an RF signal via a downstream service flow communication channel 330 to downstream configuration component 304.

In conventional hybrid fiber coax (HFC) network nodes, the configuration between service flows and home networks are hardwired, and as such, downstream configuration component 304 must transmit the optical signals to each of NAC 308, NAC 310, NAC 312 and NAC 314 based on the current configuration of network node 110.

Each of NACs 308, 310, 312 and 314 provides data over RF signals in the downstream direction to respective home networks at the correct power level. Similarly, each of NACs 308, 310, 312 and 314 provides data over RF Signals in the upstream direction from the respective home networks at the correct power level.

The network node 110 in a 1×1 configuration since there is just one downstream service flow group and one upstream service flow group, and data from one service flow is transmitted to network node 110. In this example embodiment, the downstream service flows are transmitted as RF signal 332 to NAC 308, as RF signal 334 to NAC 310, as RF signal 336 to NAC 312, and as RF signal 338 to NAC 314.

After being received, NAC 308 will transmit RF signal 332 to subscriber 322, NAC 310 will transmit RF signal 334 to subscriber 324, NAC 312 will transmit RF signal 336 to subscriber 326, and NAC 314 will transmit RF signal 338 to communication line 128 (to residence 208, in FIG. 2).

Simultaneously, data being transmitted by each subscriber will be received by the subscribers corresponding NAC and then transmit as an RF signal to upstream configuration component 306. Upstream configuration component 306 will then combine RF signals as configured and transmit the received data as RF signals to communication component 302 based on its current configuration. Continuing the above example, since network node 104 is in a 1×1 configuration, upstream configuration component 306 will combine the four RF signals from four upstream service flow lines as RF signals 340, 342, 344 and 346 into a single RF signal and transmit the resulting RF signal data as a single upstream service flow data on an upstream service flow communication channel 348 to optical communication component 302. Once received, optical communication component 302 will convert and transmit the data to service provider server 102 as a single optical signal via service provider upstream line 126.

At the subscriber connection level, each NAC provides a separate service flow for each subscriber. For instance, NAC 308 provides service flow 348 to subscriber 322, NAC 310 provides service flow 350 to subscriber 324, NAC 312 provides service flow 352 to subscriber 326, and NAC 314 provides service flow 354 to communication line 128 (to residence 208, FIG. 2C). By default, all service pools are configured and assigned equally to all subscribers shared in a single service flow group.

As shown in FIG. 3A, communication line 128 provides service flow to residence 208 (in FIG. 2) and is directly connected to cable modem 212. In case residence 208 requires additional bandwidth for its service, it will request service provider server 110 to increase its service flow. This will be described in greater detail with reference to FIG. 3B.

Figure 3B:
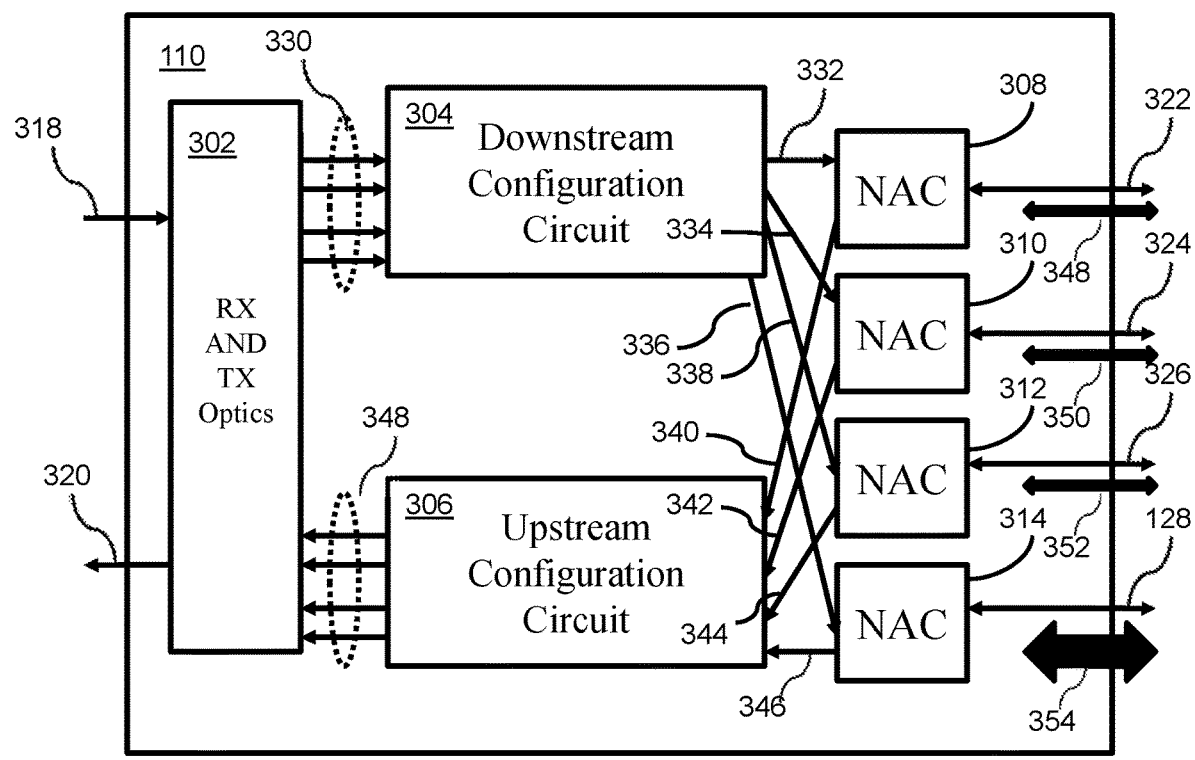
FIG. 3B illustrates an exploded view of the network node with multiple service flows for multiple subscribers (home networks) with one has been increased in bandwidth.

FIG. 3B illustrates an exploded view of the network node with multiple service flows for upstream and downstream along with multiple service flows where one has been increased for a specific subscriber at time $t_1$. At time $t_1$, a user (not shown) of residence 208 has requested for additional bandwidth for its service, so service provider server 102 instructs network node 110 to increase the bandwidth provided on communication line 128, service flow 354. As observed in FIG. 3B, service flow 354 is larger than all other service flows, 348, 350, and 352. In a situation when a user at residence 208 requests additional service for its VPN traffic, service provider server 110 does not differentiate different traffic types within one home network. Service provider server 102 will only instruct network node 110 to increase bandwidth of service flow 354 for communication line 128. This causes a major issue at home network level since increasing service flow on communication line 128, to residence 208 in FIG. 2, only addresses the bandwidth increase request in general and does address the request which is specifically for only a traffic bandwidth increase for residence 208. At the home network level, traffic flow now has to compete with residential traffic for more bandwidth so its quality of service is not always the same.

What is needed is a system and method for providing separate bandwidths and quality of service for traffic from a home network.

A system and method in accordance with the present disclosure provides separate bandwidth and quality of service for traffic from a home network.

In accordance with the present disclosure, the present disclosure creates separate service flows for both downstream and upstream service flows along with different set of quality of service for each service flow. For example, each service flow can be used for different traffic types at a home network level: one for residential traffic, and the other is for work-related traffic. By keeping these traffic types separately along with different set of quality of service, it allows the end-user to control the priority and quality of service for each traffic type on demand.

An example of a need for implementation of a system in accordance with the present disclosure is during the pandemic period, many companies have to allow their employees to work from home. This poses a lot of concerns for the companies regarding security access for their employees when they access the corporate network through the private connection. Companies want to make sure that all remote connections are secured and protected. Additionally, in case of companies who provide their employees a set of hardware such as PC/laptop, printer, etc., they also have worry about maintaining their properties by upkeeping the hardware with the latest software updates and drivers. With the existing configuration of the home network, companies have very limited control over all remote connections and no flexibility over controlling and maintaining their hardware.

Continuing with this example, from the employees' point of view, when working remotely from home, they do not have any capability to separate the residential traffic from work-related traffic. All traffic is intertwined into one connection and service pool through their cable modem connection and is not always secure. Additionally, in a home where there are multiple users with multiple client devices connecting to the same home network, the employee may experience slowness with work-related traffic since the work-related traffic have to compete with all other residential traffic in the same network.

In some embodiments, a cable modem includes router functionality, wherein when two groups of devices assigned to two service flow groups (home and business), the cable modem functions as a router by separating the data to go into the correct service flow group (upstream) and the correct Wi-Fi SSID (downstream).

An example system and method for providing separate service flows for both downstream and upstream along with different set of quality of service for residential and work-related traffic within a home network in accordance with aspects of the present disclosure will be described in greater detail with reference to FIGS. 4-8.

Figure 4:
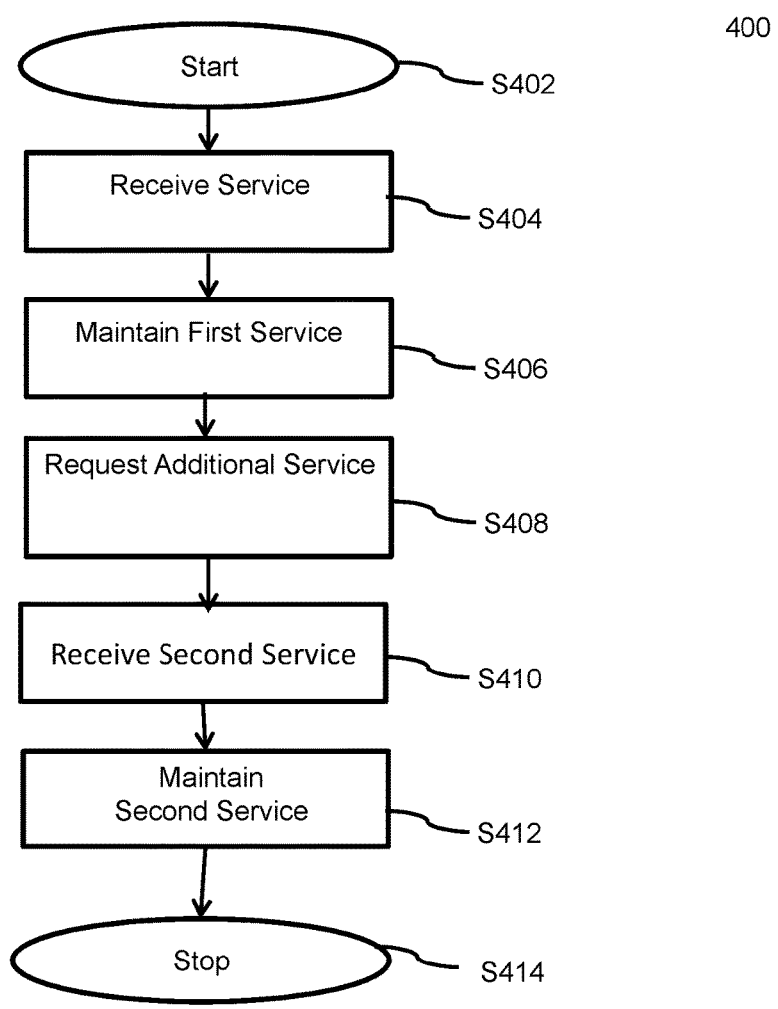
FIG. 4 illustrates an example method of operating a network node in accordance with aspects of the present disclosure.

FIG. 4 illustrates an example algorithm 400 to be executed by a processor for providing separate service flows for both downstream and upstream along with different sets of quality of service for residential and work-related traffic within a home network, in accordance with aspects of the current disclosure.

As shown in FIG. 4, algorithm 400 starts (S402) and the home network receives the first service flows (S404). This will be further described with additional reference to FIG. 5 and FIG. 6A.

Figure 5:
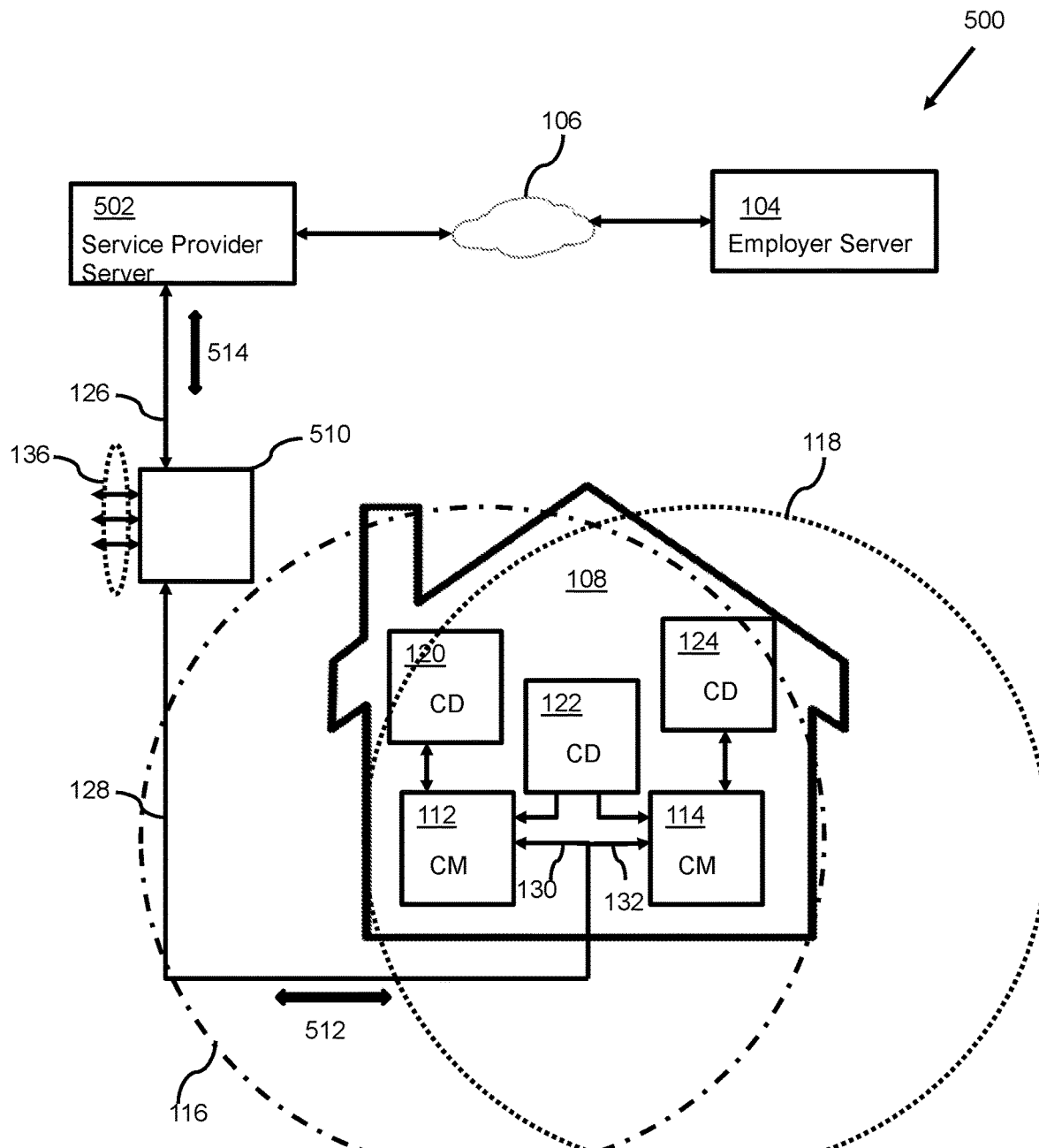
FIG. 5 illustrates an example communication infrastructure with two cable modems at time $t_2$, in accordance with aspects of the present disclosure.

FIG. 5 illustrates communication infrastructure 500 at time $t_2$, in accordance with aspects of the present disclosure;

As shown in FIG. 5, residence 108 includes: a cable modem 112; a cable modem 114; and a plurality of client devices, a sample of which are illustrated as client devices 120, 122, and 124. There are two wireless networks, 116 and 118, in residence 108 which are provided by the two cable modems, 112 and 114, where each one is on a separate band, 4 GHz and 5 GHz. At time $t_2$, cable modem 114 has established communication with network node 510 via communication line 128. Additionally, network node 510 also provides both upstream service flow and downstream service flow. For simplicity, both downstream service flow and upstream service flow are shown as a service flow 512. Service provider server 502 connects with network node 510 through communication connection 126 and also provides a service flow 514 for both upstream and downstream service flows, which are dedicated for all traffic from residence 108. Network node 510 provides a plurality of service flows to multiple subscribers, or home networks, which, for simplicity, represents with service group flow 136.

Figure 6A:
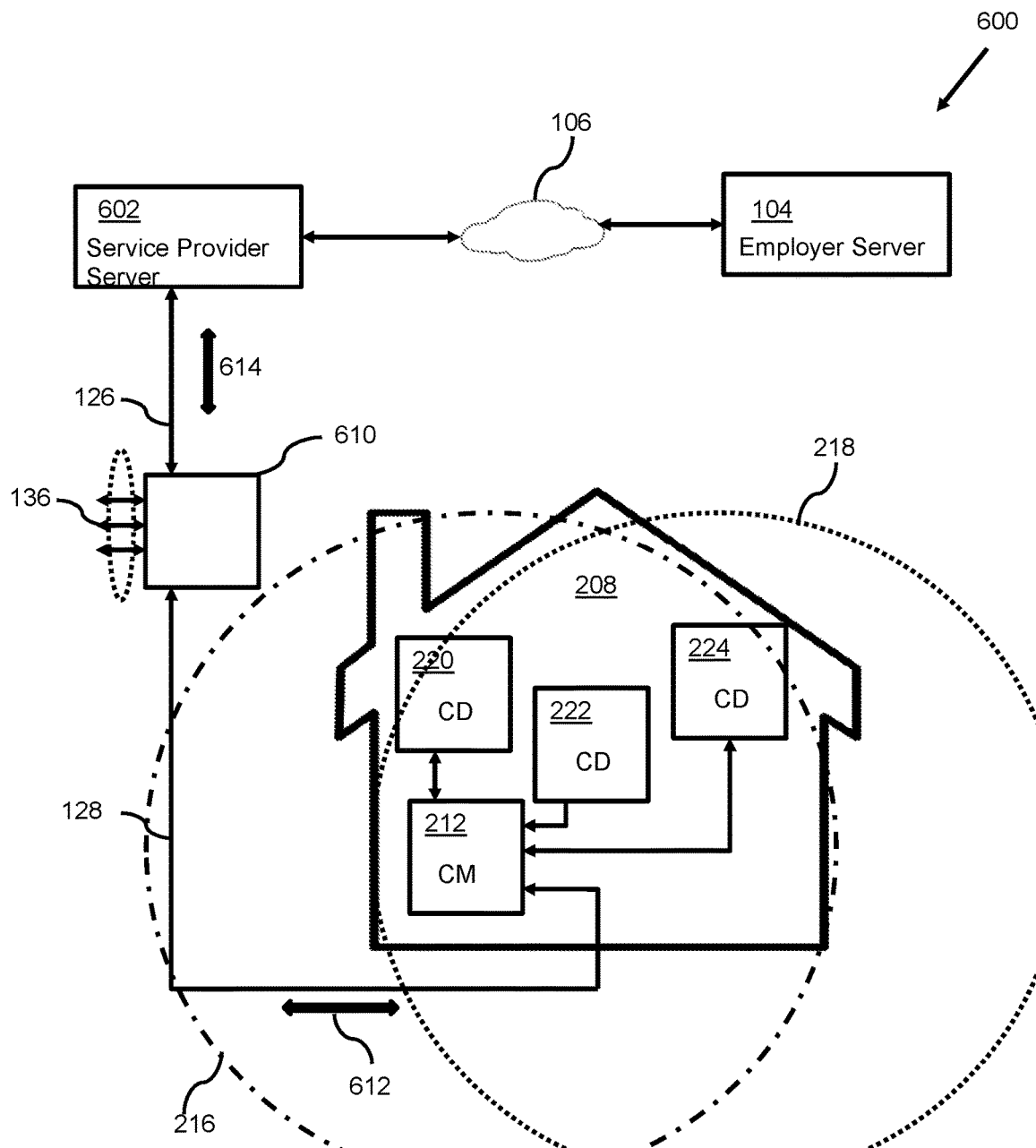
FIG. 6A illustrates another example communication infrastructure with one cable modem at time $t_2$, in accordance with aspects of the present disclosure.

FIG. 6A illustrates communication infrastructure 600 at time $t_2$, in accordance with aspects of the present disclosure.

As show in the figure, residence 208 includes: a cable modem 212; and a plurality of client devices, a sample of which are illustrated as client devices: 220, 222, and 224. In this scenario, shown as another embodiment of FIG. 5, cable modem 212 provides two wireless networks, 216 and 218, which each one on a separate band, 4 GHz and 5 GHz. At time $t_2$, cable modem 212 has established communication connection 608 with network node 610. Additionally, network node 610 also provides service flow 612 for cable modem 212. Service provide server 602 connects with network node 610 through communication connection 126 and also provides a service flow 614 for both upstream and downstream service flows, which is dedicated for all traffic from residence 208. This process will be described in greater detail with reference to FIG. 8.

Figure 8:
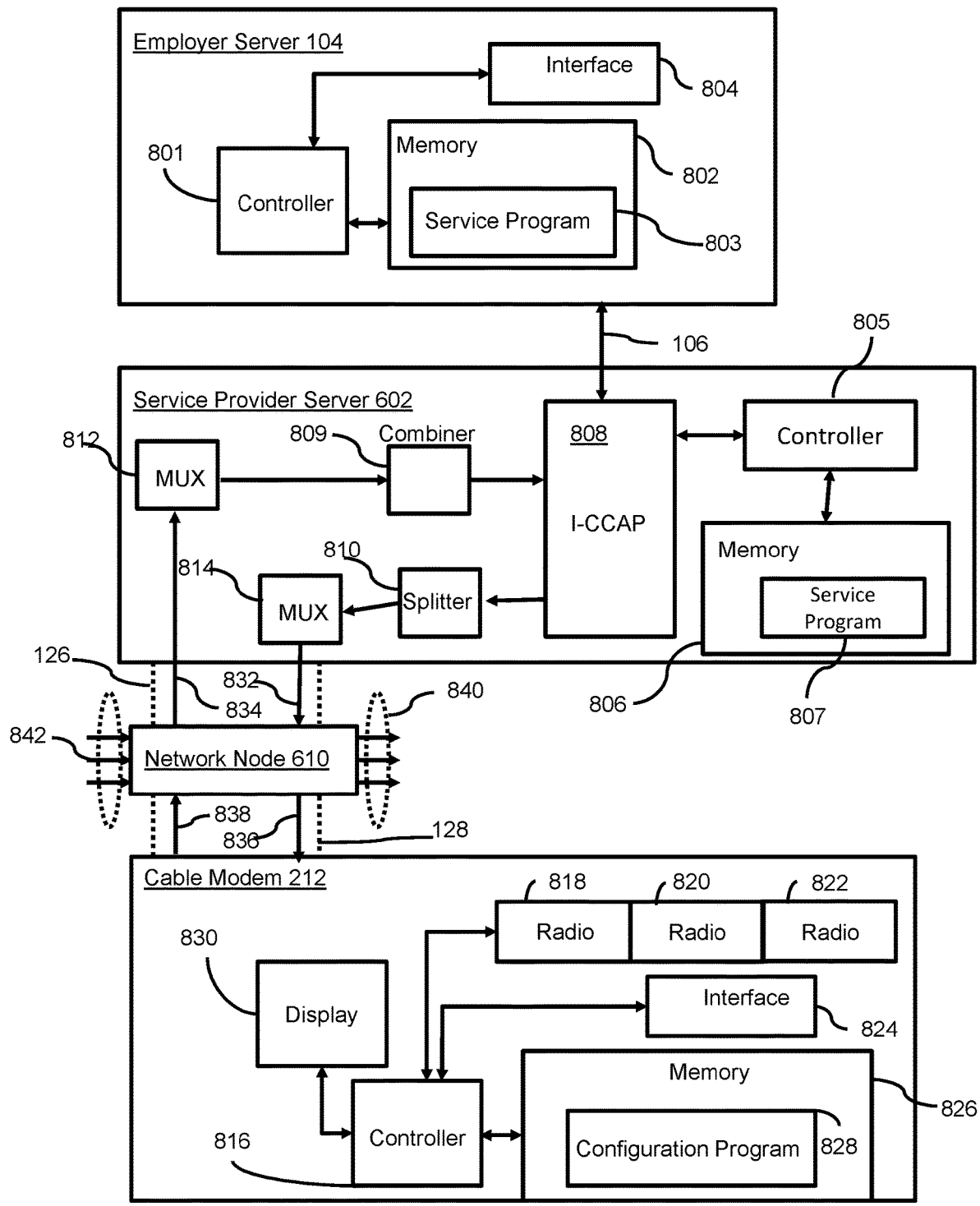
FIG. 8 illustrates an exploded view of the employer server, the service provided server, and the cable modem in home network of FIG. 6A.

FIG. 8 illustrates an exploded view of employer server 104, service provider server 602, and cable modem 212 of FIG. 6A.

As shown in FIG. 8, employer server 104 includes: a controller 801, a memory 802, which has stored therein a service program 803, and an interface circuit 804.

In this example, controller 801, memory 802, and interface circuit 804 are illustrated as individual devices. However, in some embodiments, they may be combined as a unitary device. Whether as individual devices or as combined devices, controller 801, memory 802, and interface circuit 804 may be implemented as any combination of an apparatus, a system and an integrated circuit. Further, in some embodiments, at least one of controller 801, memory 802, and interface circuit 804 may be implemented as a computer having non-transitory computer-readable media for carrying or having computer-executable instructions or data structures stored thereon.

Controller 801 can include a dedicated control circuit, CPU, microprocessor, etc. Controller 801 controls the circuits of employer server 104.

Memory 802 can store various programming, user content, and data as service program data 803. As will be discussed in more detail below, service program data 803 includes instructions that may be used by controller 801 to cause service provider server 602 to provide a first downstream service flow to cable modem 212 by way of network node 610, receive the first upstream service flow from cable modem 212 by way of network node 610, provide the second downstream service flow to cable modem 212 by way of network node 610, and receives the second upstream service flow from cable modem 212 by way of network node 610.

Service provider server 602 includes: a controller 805, a memory 806, which has stored therein a service program data 807, an I-CCAP 808, a combiner 809, a splitter 810, an upstream MUX 812, and a downstream MUX 814.

In this example, controller 805, memory 806, I-CCAP 808, a combiner 809, splitter 810, upstream MUX 812, and downstream MUX 814 are illustrated as individual devices. However, in some embodiments, they may be combined as a unitary device. Further, in some embodiments, controller 805 and memory 806 may be implemented as a computer having tangible computer-readable media for carrying or having computer-executable instructions or data structures stored thereon.

Controller 805 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of service provider 602 in accordance with the embodiments described in the present disclosure.

Memory 806 can store various programming, user content, and data as service program data 807. As will be discussed in more detail below, service program data 807 includes instructions that may be used by controller 801 to cause service provider server 602 provide to provide a first downstream service flow to cable modem 212 by way of network node 610, receive the first upstream service flow from cable modem 212 by way of network node 610, provide the second downstream service flow to cable modem 212 by way of network node 610, and receives the second upstream service flow from cable modem 212 by way of network node 610.

I-CCAP 808 is a platform which integrates multiple functions including a Data Over Cable Service Interface Specification (DOC SIS) cable modem termination system (CMTS), broadcast video Quadrature Amplitude Modulation (QAM) standard, Video On-Demand (VOD) Edge QAMs (EQAMS), and Set-top Box (STB) Out-Of-Band control. I-CCAP 808 provides broadband data for each cable modem, for example cable modem 610, as an RF signal with a spectrum of frequencies.

Combiner 809 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving RF signals from upstream MUX 812, combine and split RF signals as necessary and transmit them as a single RF signal to I-CCAP 808.

Splitter 810 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving multiple RF signals from I-CCAP 808 plus other RF signals from other sources in the broadband data provider facility; and then split and combine the RF signals to effectively route them to downstream MUX 814.

Upstream MUX 812 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving an optical signal from network node 610 and then de-multiplex and receive (RX) the optical signal into separate RF signals for transmission to combiner 809.

Downstream MUX 814 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving the RF signals from splitter 810 and then optically transmit (TX) and multiplex the RF signals together on multiple wavelengths for transmission as a single optical signal to network node 610. Therefore the signal from downstream MUX 814 on communication line 126 is a collection of one or more service flow data signals.

Network node 610, in this figure, only represents in term of providing service flow groups between service provider server 602 and multiple subscribers, a sample of which is residence 208 in FIG. 6A. Network node 610 provides a plurality of service flows, to multiple subscribers (or home networks) respectively. The plurality of service flows from network node 610 includes: downstream service flow group 840 and upstream service flow group 842. For example, network node 610 connects to service provider server 602 via communication line 126, where it provides a group of service flows indicated as upstream service flow group 834 and downstream service flow group 832.

Downstream service flow group 832 includes a plurality of distinct service flows that are split into individual service flows to be provided to different residences, which in this example includes a plurality of downstream service flows 840 to be provided to a plurality of respective cable modems at other residences (not shown) and a downstream service flow 836 to be provided to cable modem 212 via communication line 128.

Upstream service flow group 834 includes a plurality of distinct service flows that are multiplexed from individual service flows that were provided from the different residences, which in this example includes a plurality of upstream service flows 842 to be provided from the plurality of respective cable modems at other residences (not shown) and an upstream service flow 838 to be provided from cable modem 212 via communication line 128.

Cable modem 212 includes: a controller 816; a memory 826, which has stored therein a configuration program 828; three radios: 818, 820, and 822; an interface 824; and a display 830.

In this example, controller 816, memory 826, radios 818, 820, and 822, interface 824, and display 830 are illustrated as individual devices. However, in some embodiments, they may be combined as a unitary device. Further, in some embodiments, controller 816 and memory 826 may be implemented as a computer having tangible computer-readable media for carrying or having computer-executable instructions or data structures stored thereon.

Controller 816, which can include a dedicated control circuit, CPU, microprocessor, etc., controls the circuits of cable modem 212.

Memory 826 can store various programming and configuration as configuration program 828. As will be discussed in more detail below, configuration program 828 includes instructions that may be used by controller 816 to cause cable modem 212 to send request for the first service flow for residential traffic to service provider server 602 by way of network node 610 and to send request for the second service flow for use with work-related traffic to service provider server 602 by way of network node 610.

In some embodiments, as will be described in more detail below, configuration program 828 includes instructions that may be used by controller 816 to cause cable modem 212 to provide wireless network 216 having a first SSID; provide wireless network 218 having a second SSID; receive a first downstream service flow and provide first service flow data to wireless network 216; receive a second downstream service flow and provide the second service flow data to wireless network 218; receive first upstream service flow data from wireless network 216 and transmit the first upstream service flow data to service provider server 602 via the first upstream service flow; and receive second upstream service flow data from wireless network 218 and transmit the second upstream service flow data to service provider server 602 via the second upstream service flow.

In some embodiments, as will be described in more detail below, configuration program 828 includes instructions that may be used by controller 816 to cause cable modem 212 to provide the first service flow data only to wireless network 216; provide the second service flow data only to wireless network 218; transmit the first upstream service flow data to service provider server 602 via only the first upstream service flow; and transmit the second upstream service flow data to service provider server 602 via only the second upstream service flow.

In some embodiments, as will be described in more detail below, cable modem 212 may be used with a first client device associated with network 216, and a second client device associated with wireless network 218. In some of these embodiments, configuration program 828 includes instructions that may be used by controller 816 to cause cable modem 212 to provide the first service flow data only to the first client device via wireless network 216; and provide the second service flow data only to the second client device via wireless network 218.

In some embodiments, as will be described in more detail below, cable modem 212 may be used with a first client device associated with network 216, and a second client device associated with wireless network 216. In some of these embodiments, configuration program 828 includes instructions that may be used by controller 816 to cause cable modem 212 to provide the first service flow data only to the first client device via wireless network 216; and provide the second service flow data only to the second client device via wireless network 216.

Figure 6B:
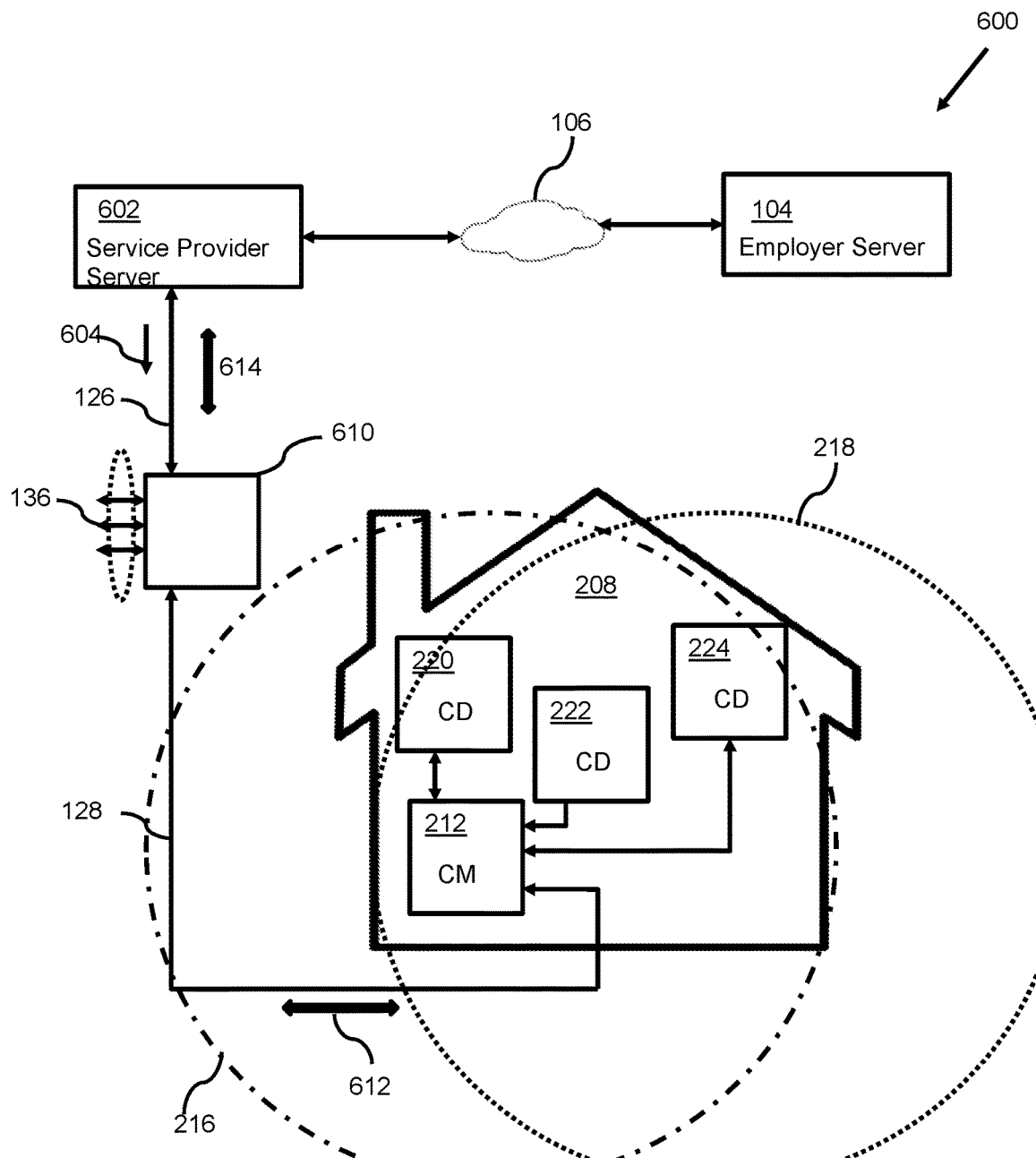
FIG. 6B illustrates communication infrastructure of FIG. 6A at time $t_3$.

Radios 818, 820 and 822 may include a Wi-Fi WLAN interface radio transceiver that is operable to communicate with client devices 220, 222 and 224 as shown in FIG. 6B. Each radio 532 may include one or more antennas to communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Cable modem 212 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

As shown in FIG. 8, service provider server 602 connects with cable modem 212 by way of network node 610. Network node 610 provides connections to multiple cable modems in the network; an example of which is cable modem 212. Network node 610 will be described in greater detail in reference to FIG. 7A.

Figure 7A:
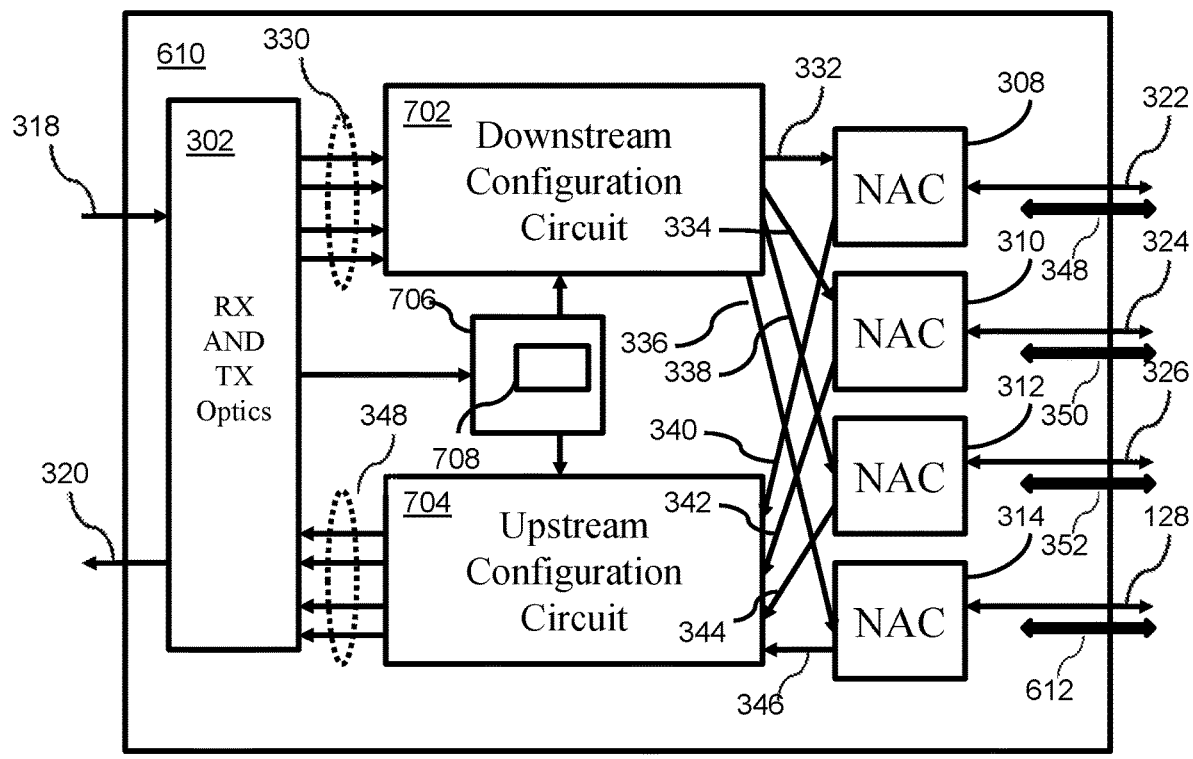
FIG. 7A illustrates an exploded view of the network node in FIG. 6A at time $t_2$.

FIG. 7A illustrates an exploded view of the network node 610 with data in FIG. 6A at time $t_2$.

As show in FIG. 7A, network node 610 includes: an optical communication component 302, a downstream configuration circuit 702, a processor 706 which has stored therein a configuration memory 708, an upstream configuration circuit 704, and a network access component (NAC) 308, a NAC 310, a NAC 312, and a NAC 314.

In operation, optical communication component 302 will receive the optical service group provider downstream data signals transmitted by service provider server 102 via service provider downstream line 318. Once received, optical communication component 302 will de-multiplex the wavelengths from the single optical line into separate optical signals that are then converted into RF signals. In this example embodiment, the optical signal received contains a wavelength. At this time, optical communication component 302 will transmit the wavelength as an RF signal via a downstream service flow communication channel 330 to downstream configuration component 702.

In conventional hybrid fiber coax (HFC) network nodes, the configuration between service flows and home networks is hardwired, and as such, downstream configuration component 702 must transmit the RF signals to each of NAC 308, NAC 310, NAC 312 and NAC 314 based on the current configuration of network node 610.

Each of NACs 308, 310, 312 and 314 provide data over RF signals in the downstream direction to respective home networks at the correct power level. Similarly, each of NACs 308, 310, 312 and 314 provide data over RF signals in the upstream direction from the respective home networks at the correct power level.

The network node 610 is in a 1×1 configuration since there is just one downstream service flow and one upstream service flow, and data from one service flow is transmitted to network node 610. In this example embodiment, the downstream service flow is transmitted as RF signal 332 to NAC 308, as RF signal 334 to NAC 310, as RF signal 336 to NAC 312, and as RF signal 338 to NAC 314.

After being received, NAC 308 will transmit RF signal 332 to subscriber 322, NAC 310 will transmit RF signal 334 to subscriber 324, NAC 312 will transmit RF signal 336 to subscriber 326, and NAC 314 will transmit RF signal 338 to communication line 128 (to residence 208 in FIG. 6A).

Simultaneously, data being transmitted by each home network will be received by the home networks corresponding NAC and then transmit as an RF signal to upstream configuration component 704. Upstream configuration component 704 will then combine RF signals as configured and transmit the received data as RF signals to communication component 302 based on its current configuration. Continuing the above example, since network node 610 is in a 1×1 configuration, upstream configuration component 704 will combine the four RF signals from the four upstream service flow lines as RF signals 340, 342, 344 and 346 into a single RF signal and transmit the resulting RF signal data as a single upstream service flow data on an upstream service flow communication channel 348 to optical communication component 302. Once received, optical communication component 302 will convert and transmit the data to service provider server 602 as a single optical signal via service provider upstream line 320.

At the subscriber connection level, each NAC provides a separate service flow for each subscriber. For instance, NAC 308 provides service flow 348 to subscriber 322, NAC 310 provides service flow 350 to subscriber 324, NAC 312 provides service flow 352 to subscriber 326, and NAC 314 provides service flow 612 to communication line 128 (to residence 208 in FIG. 6A).

Figure 6C:
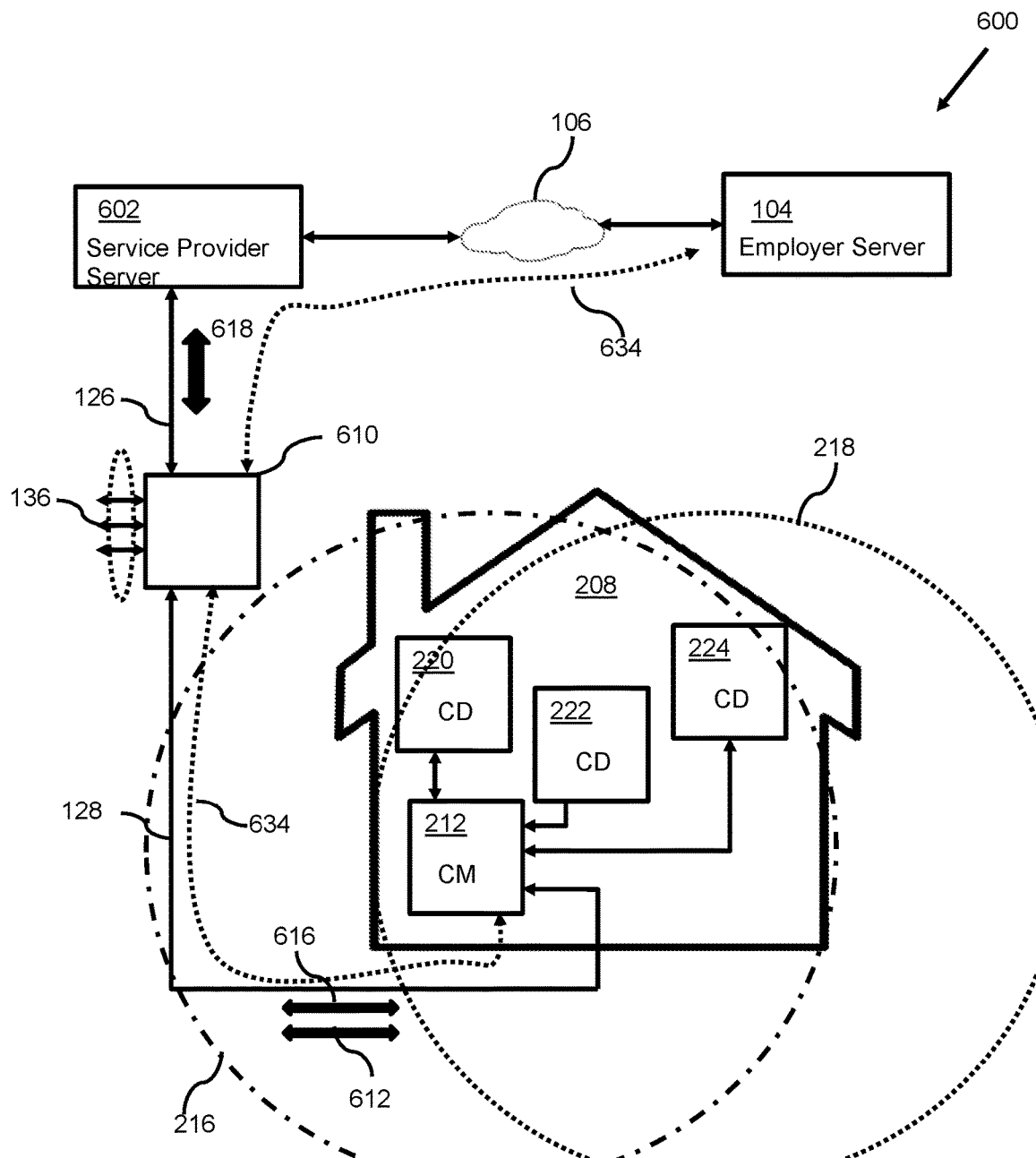
FIG. 6C illustrates communication infrastructure of FIG. 6A at time $t_4$.

Memory 708 stores various programming with instructions inside, so when executed by processor 706, it enables processor 706 to communicate with downstream configuration circuit 702 and upstream configuration circuit 704 to provide service flow 612 for communication line 128 (as shown in FIG. 6C), which connects to residence 208.

Returning to FIG. 4, after the home network has received the first service flow (S404), it will maintain the first service flow (S406). The home network then requests for additional service (S408). This will be referenced in FIG. 6B.

FIG. 6B illustrates communication infrastructure 600 at time $t_3$, in accordance with aspects of the present disclosure.

As shown in FIG. 6B, residence 208 at time $t_4$, has already received service flow 612 which consists of both upstream and downstream service flows. Also, between service provider server 602 and network node 610 is a combination of upstream and downstream service flows group 614 and one of those is service flow 612 at communication line 128 provided for residence 208. At this point, residence 208 requests service provider server 602 for additional service. Service provider server 602, after receiving the request, sends service instruction 604 to network node 610 to request network 610 to create the second service flow for residence 208. This process will be described in greater detail with reference to FIG. 7B.

Figure 7B:
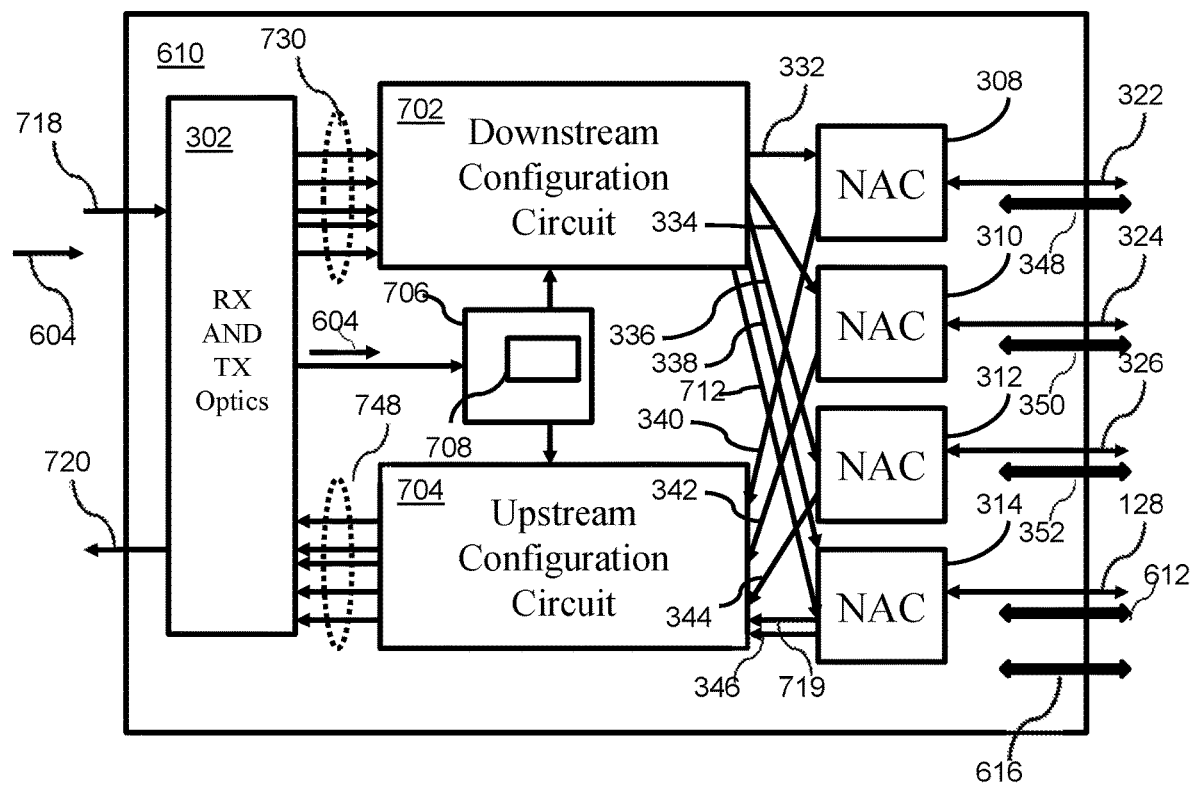
FIG. 7B illustrates an exploded view of the network node in FIG. 6C at time $t_4$.

FIG. 7B illustrates an exploded view of network node 610 in FIG. 6C at time $t_4$.

As shown in FIG. 7B, similar to FIG. 7A, at time $t_3$, when receiving service instruction 604 from service provider server 602, processor 706 will modify both downstream configuration circuit 702 and upstream configuration circuit 704 to provide additional service for communication line 128, which connects to residence 208. At this point, there are 2 service flows: service flow 612 and service flow 616 (FIG. 6C), provided for communication line 128.

In operation, optical communication component 302 will receive the optical service group provider downstream data signals transmitted by service provider server 602 via service provider downstream line 718. Once received, optical communication component 302 will de-multiplex the wavelengths from the single optical line into separate optical signals that are then converted into RF signals. In this example embodiment, the optical signal received contains multiple wavelengths which include service instruction 604. At this time, optical communication component 302 will transmit the wavelength as an RF signal via a downstream service flow communication channel 730 to downstream configuration component 702.

In conventional hybrid fiber coax (HFC) network nodes, the configuration between service flows and home networks are hardwired, and as such, downstream configuration component 702 must transmit the RF signals to each of NAC 308, NAC 310, NAC 312 and NAC 314 based on the current configuration of network node 610.

Each of NACs 308, 310, 312 and 314 provide data over RF signals in the downstream direction to respective home networks at the correct power level. Similarly, each of NACs 308, 310, 312 and 314 provide data over RF signals in the upstream direction from the respective home networks at the correct power level.

The network node 610 is now in a 2×2 configuration, meaning that there are two one downstream service flows and one upstream service flows, and data from two service flows is transmitted to network node 610. In this example embodiment, the downstream service flows are transmitted as RF signal 332 to NAC 308, as RF signal 334 to NAC 310, as RF signal 336 to NAC 312; and as RF signal 338 and RF signal 712 to NAC 314.

After being received, NAC 308 will transmit RF signal 332 to home network 322, NAC 310 will transmit RF signal 334 to home network 324, NAC 312 will transmit RF signal 336 to home network 326, and NAC 314 will transmit both RF signal 338 and RF signal 712 to residence 208 via communication channel 128. In this embodiment, each home network has a single service flow for RF signals 332, 324, 336, and 338; additionally, communication channel 128 will be provided an additional dedicated downstream service flow as RF signal 712.

Simultaneously, data being transmitted by each home network will be received by the home networks corresponding NAC and then transmit as an RF signal to upstream configuration component 704. Upstream configuration component 704 will then combine RF signals as configured and transmit the received data as RF signals to communication component 302 based on its current configuration. Continuing the above example, since network node 610 is now in a 2×2 configuration, upstream configuration component 704 will combine the four RF signals from the four upstream service flow lines as RF signals 340, 342, 344 and 346 into a single RF signal plus another dedicated RF signal for RF signal 719 and transmit the resulting RF signal data as two upstream service flow data on an upstream service flow communication channel 748 to optical communication component 302. Once received, optical communication component 302 will convert and transmit the data to service provider server 602 as a single optical signal via service provider upstream line 720.

At the home network connection level, NACs 308, 310, and 312 provide a separate service flow, 348, 350, and 352 for subscribers 322, 324, and 326 respectively. However, NAC 314 provides two service flows 612 and 616 to communication line 128 (to residence 208 in FIG. 6C).

Returning to FIG. 4, after initiating the request for additional service (S408), the home network receives a second service flow (S410). This will be referenced in FIG. 6C.

FIG. 6C illustrates communication infrastructure 600 in FIG. 6A at time $t_4$, in accordance with aspects of the present disclosure.

As shown in the figure, at time $t_4$, network node 610 provides service flow 616 for residence 208 in addition to the existing service flow 612. Residence 208 now has 2 dedicated and distinct service flows, 612 and 616.

On the service provider server side, there is now a new combination of upstream and downstream service flow group 618, which includes the new service flow 616 in addition to those part of service flow group 614 (in FIG. 6B) as part of service flow group between service provider server 602 and network node 610.

Additionally, a VPN tunnel 634 between employer server 104 and residence 208 can be provided through the new service flow, service flow 612, for residence 208 as part of additional QoS. Accordingly, the service flow 616 may be configured to have distinct QoS and privileges as determined by employer server 104. By maintaining a dedicated and distinct service flow, employer server and the user of home Returning to FIG. 4, after receiving a service flow (S410), the home network maintains the second service flow (S412).

Referring to FIG. 6C, since there are two service flows available for residence 208, residence 208 can maintain each service flow for different traffic types in the network. For example, one is dedicated to residential traffic, and the other is dedicated to work-related traffic. Accordingly, cable modem 212 includes router functionality, wherein when two groups of devices assigned to two service flow groups (home and business), cable modem 212 functions as a router by separating the data to go into the correct service flow group (upstream) and the correct Wi-Fi SSID (downstream).

Returning to FIG. 4, once the home network has maintained the second service flow (S412), algorithm 400 stops at S414.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

In some embodiments, a system may be configured to include a mechanism to support an applied virtualized network function to the cable modem or any access point devices in the home network to present a WPA encrypted Wi-Fi SSID connection point to enable the ability to offer Corporate Wi-Fi overlay into a residential access point device or gateway device.

In some embodiments, a system may configured to include a mechanism to support two tunnels in a cable modem device that can be used to separate home residential traffic from working from home traffic which includes: scheme that can allow for different QoS and bandwidths applied to these two traffic types. Further, this system may enable a scheme for an internet service provider to be able to apply two distinct tariffs to the home—one for residential use for example at 24×7 and the other for corporate traffic use for example at 9-5 or week day only rates. This system may additionally enable a scheme for the internet service provider to separate packets for separate use in the home, e.g., packets for residential traffic and packets for working from home traffic.

In some embodiments, a system may configured to include a near field communication (NFC) mechanism to apply to a gateway device or access point device to indicate the start and end of connectivity usage. This mechanism may include: the signing in act of the worker from home, which may open up the corporate VPN or Remote WPA link for work usage. When the NFC next message occurs, the gateway device or access point device may then disconnect the corporate connection—VPN or remote Wi-Fi Protected Access (WPA), and also remove any work-related or corporate SSID or Ethernet connections until an NFC message is received again.

In some embodiments, a system may configured to include smart phone based Bluetooth Low Energy (BLE) beacon system that is checked by a BLE supported work-related gateway device or access point device that will only allow predetermined processes, non-limiting examples of which include presentation of work-related Wi-Fi SSID, Ethernet traffic, connection to the Internet, and combinations thereof, when the defined employee smartphone BLE beacon is detected. Otherwise, internet connection may be disconnected and a work-related SSID may be removed when a BLE beacon is not present.

In some embodiments, a system may configured to include a mechanism to use a combination of Wi-Fi 6E Low-Power Indoor (LPI) and Very Low-Power Indoor (VLPI) modes to create a gateway device having a work-related access point backhaul connection using LPI power levels; or an in-home office room Wi-Fi 6E VLPI network for in room work-related only Wi-Fi solution.

In some embodiments, a system may configured to include a user driven operation mode that can tune down Wi-Fi 6E Wi-Fi power to only connect to specific devices in the room designated as the home office.

In some embodiments, a system may configured to include a mechanism on a gateway device or access point device to shut down both the Internet and a home LAN connectivity based on: cloud based work day time calendar—permitting only certain work hours at home; corporate policies applied to the gateway device/access point device; or traffic quota thresholds exceeded through the gateway device/access point device on an hourly level.

In some embodiments, a system may configured to include a mechanism to effect employee tracking based on traffic patterns and types in the gateway device/access point device versus time.

In some embodiments, a system may be configured to include a mechanism for a remote IT department to be able to: access a work-related gateway device/access point device; provide administration functions; reboot the device remotely; update software; or apply usage policies.

In a conventional communication network, when a home network requests for additional service, the service provider simply increases the bandwidth for existing service flow that has been assigned to the home network. However, this does not alleviate the need of the home network to differentiate different types of traffic, for example, residential versus work-related traffic, along with providing different privilege level for each traffic type. As a result, the home network suffers as it cannot provide quality of service and maintain the privilege level for each traffic type.

In accordance with aspects of the present disclosure, the network node component provides separate service flows for a home network upon request. For each service flow, different privilege and quality of service can be configured appropriately. Therefore, a home network can use each service flow for different traffic type; one for residential traffic and the other is for work-related traffic. By keeping these traffic types separately along with different set of quality of service, it allows the end-user to control the priority and quality of service for each traffic type on demand.

In the above discussed embodiments, the network node is the central component that provides novel aspects of the current disclosure; however, these embodiments of the present disclosure can also be centralized at service provider server.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A cable modem in a network for use with a service provider server configured to provide a first downstream service flow having first service flow data, to provide a second downstream service flow having second service flow data, to provide a first upstream service flow, and to provide a second upstream service flow, said cable modem comprising:
   a memory; and
   a processor configured to execute instructions stored on said memory to cause said cable modem to:
      provide a first wireless network having a first SSID, wherein the network comprises the first wireless network;
      provide a second wireless network having a second SSID, wherein the network comprises the second wireless network;
      receive the first downstream service flow and provide the first service flow data to the first wireless network;
      send a request to the service provider server for additional service;
      receive, based on the request, the second downstream service flow and provide the second service flow data to the second wireless network, wherein the first downstream service flow is distinct from the second downstream service flow, and wherein the first downstream service flow is dedicated to a first traffic type and the second downstream service flow is dedicated to a second traffic type;

receive first upstream service flow data from the first wireless network and transmit the first upstream service flow data to the service provider server via the first upstream service flow; and receive second upstream service flow data from the second wireless network and transmit the second upstream service flow data to the service provider server via the second upstream service flow.

2. The cable modem of claim 1, wherein said processor is configured to execute instructions stored on said memory to additionally cause said service provider server to:

provide the first service flow data only to the first wireless network;

provide the second service flow data only to the second wireless network;

transmit the first upstream service flow data to the service provider server via only the first upstream service flow; and transmit the second upstream service flow data to the service provider server via only the second upstream service flow.

3. The cable modem of claim 1, for additional use with a first client device associated with the first wireless network, and a second client device associated with the second wireless network, wherein said processor is configured to execute instructions stored on said memory to additionally cause said service provider server to:

provide the first service flow data only to the first client device via the first wireless network; and provide the second service flow data only to the second client device via the second wireless network.

4. The cable modem of claim 1, for additional use with a first client device associated with the first wireless network, and a second client device associated with the first wireless network, wherein said processor is configured to execute instructions stored on said memory to additionally cause said service provider server to:

provide the first service flow data only to the first client device via the first wireless network; and provide the second service flow data only to the second client device via the first wireless network.

5. A method of using a cable modem in a network with a service provider server configured to provide a first downstream service flow having first service flow data, to provide a second downstream service flow having second service flow data, to provide a first upstream service flow, and to provide a second upstream service flow, said method comprising:

providing, via a processor configured to execute instructions stored on a memory, a first wireless network having a first SSID, wherein the network comprises the first wireless network;

providing, via the processor, a second wireless network having a second SSID, wherein the network comprises the second wireless network;

receiving, via the processor, the first downstream service flow and provide the first service flow data to the first wireless network;

sending a request to the service provider server for additional service;

receiving, based on the request, via the processor, the second downstream service flow and provide the second service flow data to the second wireless network, wherein the first downstream service flow is distinct from the second downstream service flow, and wherein the first downstream service flow is dedicated to a first traffic type and the second downstream service flow is dedicated to a second traffic type;

receiving, via the processor, first upstream service flow data from the first wireless network and transmit the first upstream service flow data to the service provider server via the first upstream service flow; and receiving, via the processor, second upstream service flow data from the second wireless network and transmit the second upstream service flow data to the service provider server via the second upstream service flow.

6. The method of claim 5, wherein said providing the first service flow data comprises providing the first service flow data only to the first wireless network;

wherein said providing the second service flow data comprises providing the second service flow data only to the second wireless network;

wherein said transmitting the first upstream service flow data comprises transmitting the first upstream service flow data to the service provider server via only the first upstream service flow; and wherein said transmitting the second upstream service flow data comprises transmitting the second upstream service flow data to the service provider server via only the second upstream service flow.

7. The method of claim 5, for additional use with a first client device associated with the first wireless network, and a second client device associated with the second wireless network, further comprising:

providing, via the processor, the first service flow data only to the first client device via the first wireless network; and providing, via the processor, the second service flow data only to the second client device via the second wireless network.

8. The method of claim 5, for additional use with a first client device associated with the first wireless network, and a second client device associated with the first wireless network, further comprising:

providing, via the processor, the first service flow data only to the first client device via the first wireless network; and providing, via the processor, the second service flow data only to the second client device via the first wireless network.

9. A non-transitory, computer-readable media having computer-readable instructions stored thereon, the computer-readable instructions being capable of being read by a cable modem in a network for use with a service provider server configured to provide a first downstream service flow having first service flow data, to provide a second downstream service flow having second service flow data, to provide a first upstream service flow, and to provide a second upstream service flow, wherein the computer-readable instructions are capable of instructing the cable modem to perform the method comprising:

providing, via a processor configured to execute instructions stored on a memory, a first wireless network having a first SSID, wherein the network comprises the first wireless network;

providing, via the processor, a second wireless network having a second SSID, wherein the network comprises the second wireless network;

receiving, via the processor, the first downstream service flow and provide the first service flow data to the first wireless network;

sending a request to the service provider server for additional service;

receiving, via the processor, the second downstream service flow and provide the second service flow data to the second wireless network, wherein the first downstream service flow is distinct from the second downstream service flow, and wherein the first downstream service flow is dedicated to a first traffic type and the second downstream service flow is dedicated to a second traffic type;

receiving, via the processor, first upstream service flow data from the first wireless network and transmit the first upstream service flow data to the service provider server via the first upstream service flow; and receiving, via the processor, second upstream service flow data from the second wireless network and transmit the second upstream service flow data to the service provider server via the second upstream service flow.

10. The non-transitory, computer-readable media of claim 9, wherein the computer-readable instructions are capable of instructing the cable modem to perform the method wherein said providing the first service flow data comprises providing the first service flow data only to the first wireless network;

wherein said providing the second service flow data comprises providing the second service flow data only to the second wireless network;

wherein said transmitting the first upstream service flow data comprises transmitting the first upstream service flow data to the service provider server via only the first upstream service flow; and wherein said transmitting the second upstream service flow data comprises transmitting the second upstream service flow data to the service provider server via only the second upstream service flow.

11. The non-transitory, computer-readable media of claim 9, for additional use with a first client device associated with the first wireless network, and a second client device associated with the second wireless network, wherein the computer-readable instructions are capable of instructing the cable modem to perform the method further comprising:

providing, via the processor, the first service flow data only to the first client device via the first wireless network; and providing, via the processor, the second service flow data only to the second client device via the second wireless network.

12. The non-transitory, computer-readable media of claim 9, for additional use with a first client device associated with the first wireless network, and a second client device associated with the first wireless network, wherein the computer-readable instructions are capable of instructing the cable modem to perform the method further comprising:

providing, via the processor, the first service flow data only to the first client device via the first wireless network; and providing, via the processor, the second service flow data only to the second client device via the first wireless network.

* * * * *